US007308320B2

(12) United States Patent
Miyamori

(10) Patent No.: US 7,308,320 B2
(45) Date of Patent: Dec. 11, 2007

(54) PROCESSOR CORE FOR USING EXTERNAL EXTENDED ARITHMETIC UNIT EFFICIENTLY AND PROCESSOR INCORPORATING THE SAME

(75) Inventor: Takashi Miyamori, Yokohama (JP)

(73) Assignee: Kabushiki Kaisha Toshiba, Kawasaki-shi (JP)

(*) Notice: Subject to any disclaimer, the term of this patent is extended or adjusted under 35 U.S.C. 154(b) by 582 days.

(21) Appl. No.: 10/982,823

(22) Filed: Nov. 8, 2004

(65) Prior Publication Data

US 2005/0086277 A1 Apr. 21, 2005

Related U.S. Application Data

(63) Continuation of application No. 09/666,456, filed on Sep. 21, 2000, now Pat. No. 6,832,117.

(30) Foreign Application Priority Data

Sep. 22, 1999 (JP) ................................ 11-269532

(51) Int. Cl.
*G05B 19/18* (2006.01)
*G06F 9/30* (2006.01)

(52) U.S. Cl. .......................................... 700/2; 712/208

(58) Field of Classification Search .................... 700/2, 700/3; 710/22

See application file for complete search history.

(56) References Cited

U.S. PATENT DOCUMENTS

| | | | | |
|---|---|---|---|---|
| 5,014,196 | A * | 5/1991 | Hayashi et al. | 712/7 |
| 5,134,562 | A * | 7/1992 | Hattori et al. | 711/125 |
| 5,247,656 | A * | 9/1993 | Kabuo et al. | 713/501 |
| 5,488,729 | A * | 1/1996 | Vegesna et al. | 712/209 |
| 5,706,459 | A * | 1/1998 | Atsushi | 712/200 |
| 5,774,704 | A | 6/1998 | Williams | |
| 5,778,250 | A * | 7/1998 | Dye | 712/32 |
| 5,890,010 | A | 3/1999 | Nishigami | |

(Continued)

FOREIGN PATENT DOCUMENTS

| | | |
|---|---|---|
| JP | 57-105070 | 6/1982 |

(Continued)

OTHER PUBLICATIONS

Ricardo E. Gonzalez, "XTENSA: A Configurable and Extensible Processor," IEEE Micro, vol. 20, No. 2 Mar./Apr. 2000, pp. 60-70.

*Primary Examiner*—Thomas K. Pham
(74) *Attorney, Agent, or Firm*—Oblon, Spivak, McClelland, Maier & Neustadt, P.C.

(57) ABSTRACT

A processor core for realizing efficient operation processing by connecting an extended arithmetic unit to its exterior and a processor incorporating such a processing core are provided. The processor includes the processor core, a data memory accessed by the processor core, and the extended arithmetic unit connected to the exterior of the processor core for processing a particular instruction. The extended arithmetic unit executes an arithmetic operation by using arithmetic operation data retained in a register file in the processor core, and directly outputs an arithmetic operation result to the processor core. Then, the processor core saves the result of the arithmetic operation executed by the extended arithmetic unit and inputted therefrom in the register file in the processor core.

8 Claims, 8 Drawing Sheets

U.S. PATENT DOCUMENTS

| | | | |
|---|---|---|---|
| 5,909,565 | A | 6/1999 | Morikawa et al. |
| 5,961,628 | A | 10/1999 | Nguyen et al. |
| 5,961,631 | A | 10/1999 | Devereux et al. |
| 6,003,124 | A | 12/1999 | Laborie |
| 6,018,796 | A | 1/2000 | Suzuki et al. |
| 6,434,689 | B2 | 8/2002 | Fleck et al. |
| RE39,252 | E * | 8/2006 | Dalvi ......................... 713/501 |

FOREIGN PATENT DOCUMENTS

| | | |
|---|---|---|
| JP | 2-10427 | 1/1990 |
| JP | 4-135275 | 5/1992 |
| JP | 7-219774 | 8/1995 |
| JP | 8-69377 | 3/1996 |
| JP | 9-6614 | 1/1997 |
| JP | 9-16398 | 1/1997 |
| JP | 9-212359 | 5/1997 |

* cited by examiner

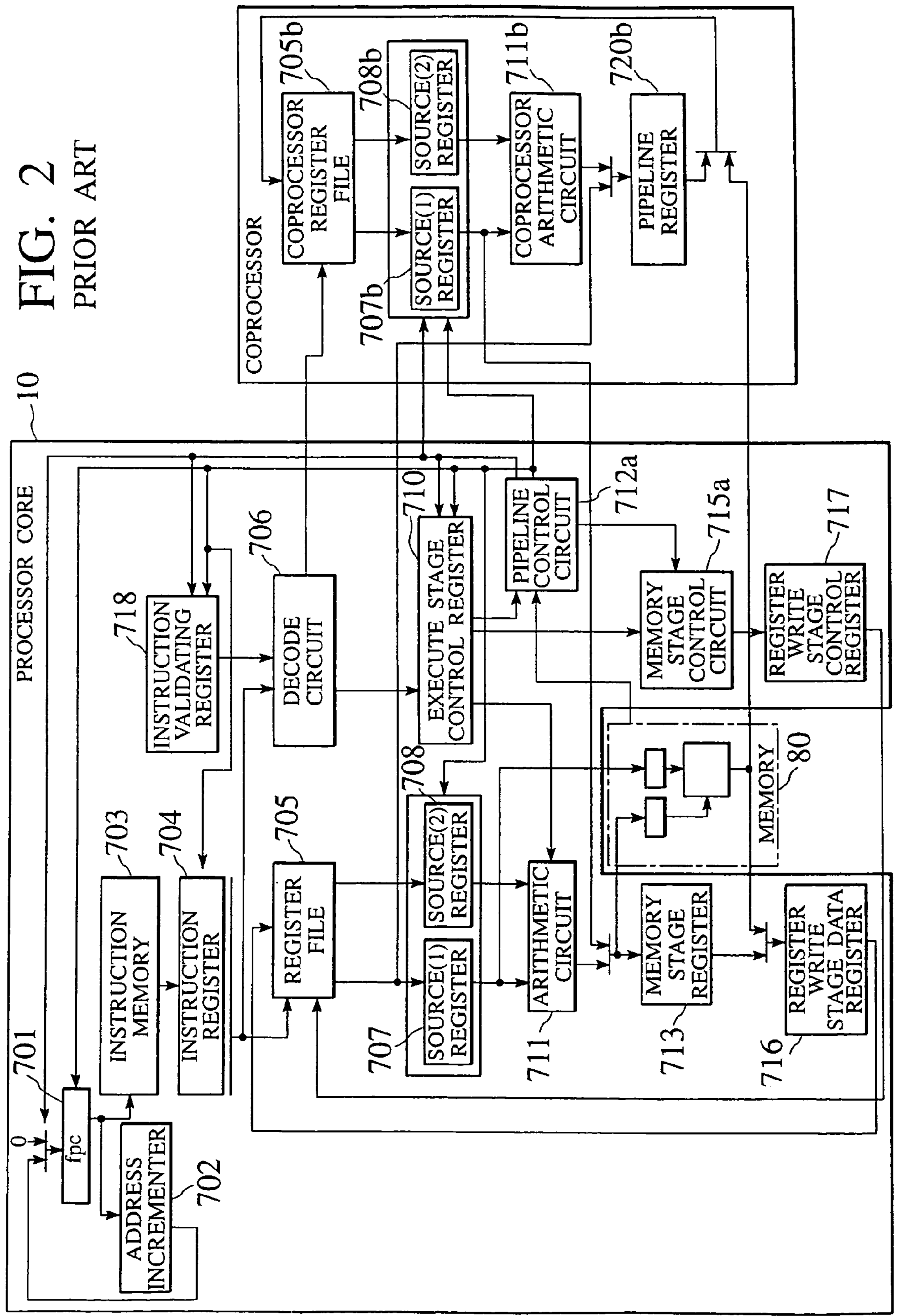
FIG. 2
PRIOR ART
COPROCESSOR
705b
COPROCESSOR REGISTER FILE
708b
SOURCE(2) REGISTER
707b
SOURCE(1) REGISTER
711b
COPROCESSOR ARITHMETIC CIRCUIT
720b
PIPELINE REGISTER
10
PROCESSOR CORE
718
INSTRUCTION VALIDATING REGISTER
706
DECODE CIRCUIT
710
EXECUTE STAGE CONTROL REGISTER
712a
PIPELINE CONTROL CIRCUIT
715a
MEMORY STAGE CONTROL CIRCUIT
717
REGISTER WRITE STAGE CONTROL REGISTER
80
MEMORY
703
INSTRUCTION MEMORY
704
INSTRUCTION REGISTER
705
REGISTER FILE
708
SOURCE(2) REGISTER
707
SOURCE(1) REGISTER
711
ARITHMETIC CIRCUIT
713
MEMORY STAGE REGISTER
716
REGISTER WRITE STAGE DATA REGISTER
701
0
fpc
ADDRESS INCREMENTER
702

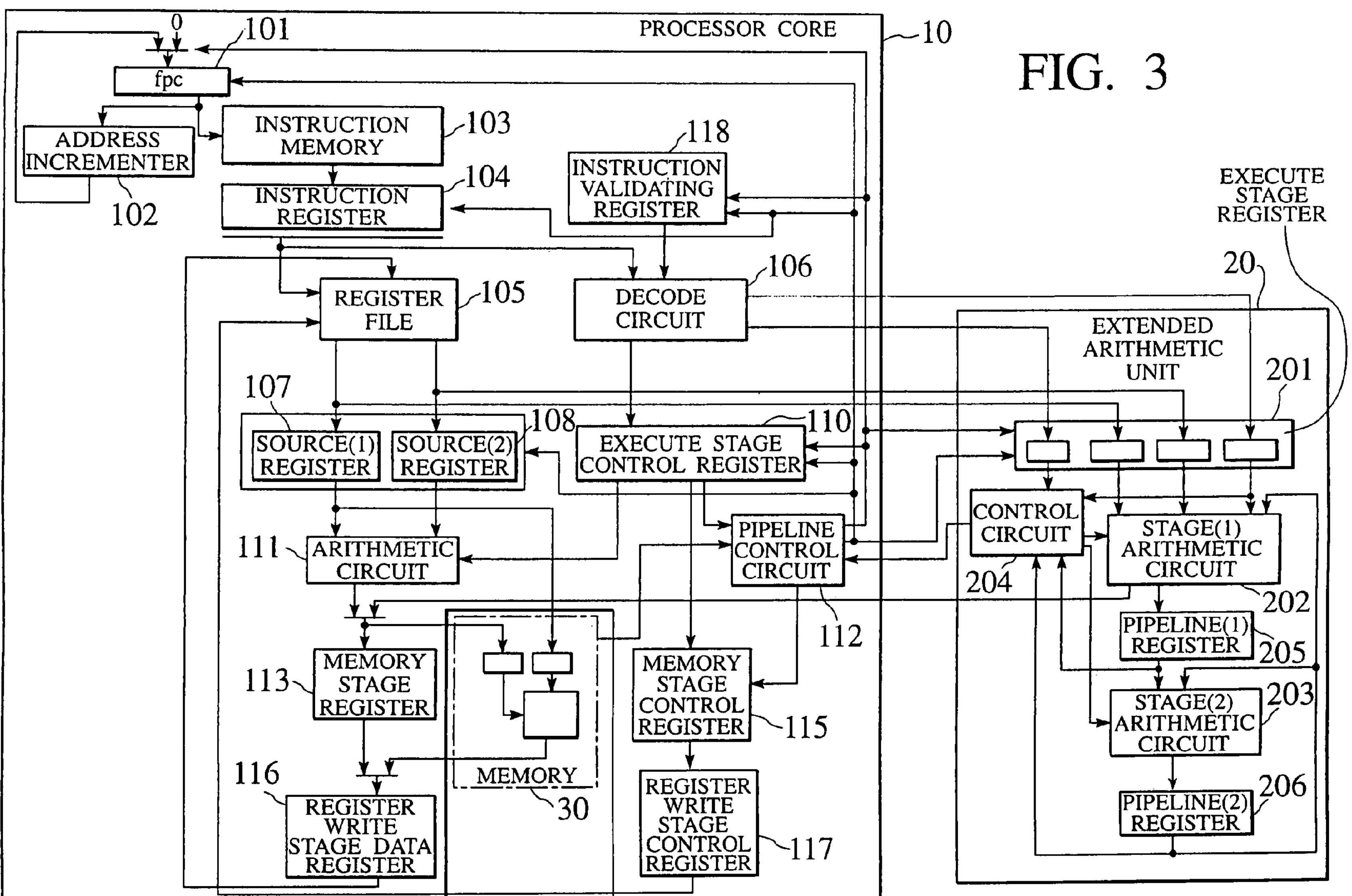
FIG. 3
PROCESSOR CORE
10
0
101
fpc
ADDRESS INCREMENTER
102
INSTRUCTION MEMORY
103
INSTRUCTION REGISTER
104
INSTRUCTION VALIDATING REGISTER
118
REGISTER FILE
105
DECODE CIRCUIT
106
107
SOURCE(1) REGISTER
SOURCE(2) REGISTER
108
EXECUTE STAGE CONTROL REGISTER
110
111
ARITHMETIC CIRCUIT
PIPELINE CONTROL CIRCUIT
112
113
MEMORY STAGE REGISTER
MEMORY
30
MEMORY STAGE CONTROL REGISTER
115
116
REGISTER WRITE STAGE DATA REGISTER
REGISTER WRITE STAGE CONTROL REGISTER
117
EXECUTE STAGE REGISTER
20
EXTENDED ARITHMETIC UNIT
201
CONTROL CIRCUIT
204
STAGE(1) ARITHMETIC CIRCUIT
202
PIPELINE(1) REGISTER
205
STAGE(2) ARITHMETIC CIRCUIT
203
PIPELINE(2) REGISTER
206

FIG. 4

| Instruction | 31–28 | 27–24 | 23–20 | 19–16 | 15–0 |
|---|---|---|---|---|---|
| add dst, src1, src2 | dst | src1 | src2 | 0000 | 0000 0000 0000 0000 |
| load dst, (src1) | dst | src1 | 0000 | 0001 | 0000 0000 0000 0000 |
| store (src1), src2 | 0000 | src1 | src2 | 0010 | 0000 0000 0000 0000 |
| jump src1 | 0000 | src1 | 0000 | 0011 | 0000 0000 0000 0000 |
| ext dst, src1, src2, code16 | dst | src1 | src2 | 0100 | code16 |

FIG. 5

| INPUTTED INSTRUCTION | | OUTPUT | | | | | |
|---|---|---|---|---|---|---|---|
| bit | 19~16 | ALU CONTROL | dst NUMBER | dst VALID | FLUSH | ext VALID | CODE16 |
| add | 0000 | 01(add) | bit31~28 | 1 | 0 | 0 | bit15~0 |
| load | 0001 | 00(nop) | bit31~28 | 1 | 0 | 0 | bit15~0 |
| store | 0010 | 00(nop) | bit31~28 | 0 | 0 | 0 | bit15~0 |
| jump | 0011 | 00(nop) | bit31~28 | 0 | 1 | 0 | bit15~0 |
| ext | 0100 | 10(ext) | bit31~28 | 1 | 0 | 1 | bit15~0 |

FIG. 6

| ALU CONTROL INPUT | ALU OUTPUT |
|---|---|
| 00 (nop) | SOURCE(1) REGISTER |
| 01 (add) | SOURCE(1) REGISTER + SOURCE(2) REGISTER |
| 10 (ext) | INPUT FROM EXTENDED ARITHMETIC UNIT |

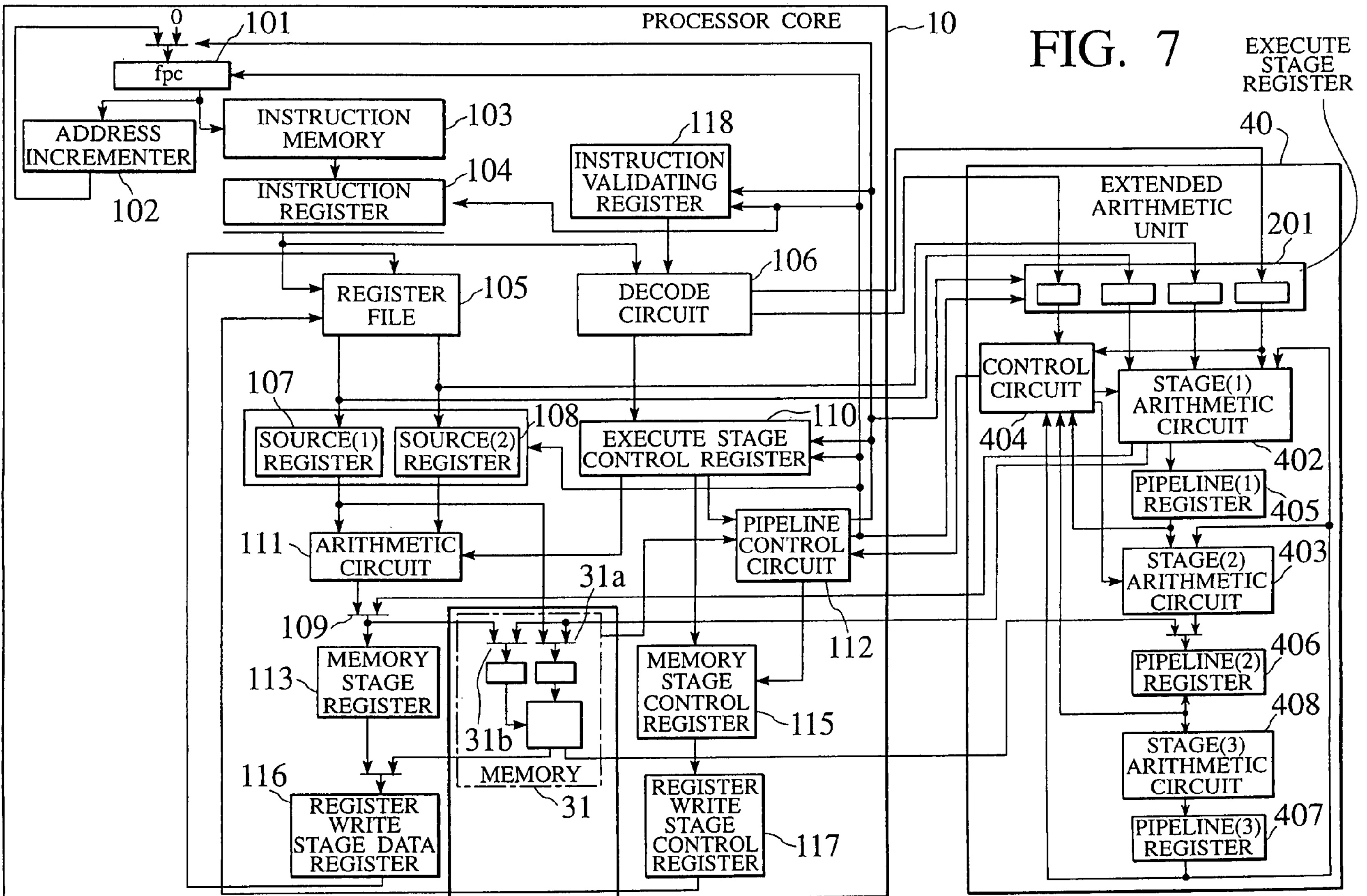
FIG. 7
PROCESSOR CORE
10
0
fpc
101
ADDRESS INCREMENTER
102
INSTRUCTION MEMORY
103
INSTRUCTION REGISTER
104
INSTRUCTION VALIDATING REGISTER
118
REGISTER FILE
105
DECODE CIRCUIT
106
107
SOURCE(1) REGISTER
SOURCE(2) REGISTER
108
EXECUTE STAGE CONTROL REGISTER
110
111
ARITHMETIC CIRCUIT
PIPELINE CONTROL CIRCUIT
112
31a
109
MEMORY STAGE REGISTER
113
31b
MEMORY
31
MEMORY STAGE CONTROL REGISTER
115
116
REGISTER WRITE STAGE DATA REGISTER
REGISTER WRITE STAGE CONTROL REGISTER
117
EXECUTE STAGE REGISTER
40
EXTENDED ARITHMETIC UNIT
201
CONTROL CIRCUIT
404
STAGE(1) ARITHMETIC CIRCUIT
402
PIPELINE(1) REGISTER
405
STAGE(2) ARITHMETIC CIRCUIT
403
PIPELINE(2) REGISTER
406
408
STAGE(3) ARITHMETIC CIRCUIT
PIPELINE(3) REGISTER
407

PROCESSOR CORE FOR USING EXTERNAL EXTENDED ARITHMETIC UNIT EFFICIENTLY AND PROCESSOR INCORPORATING THE SAME

CROSS-REFERENCE TO RELATED APPLICATIONS

This application is a continuation of co-pending U.S. patent application Ser. No. 09/666,456, filed Sep. 21, 2000, now U.S. Pat. No. 6,832,117 which in turn claims priority to Japan Patent 11-269532, filed Sep. 22, 1999, the entire contents of each of which are hereby incorporated herein by reference.

BACKGROUND OF THE INVENTION

1. Field of the Invention

The present invention relates to a processor core for using an external extended arithmetic unit efficiently and a processor incorporating the same, and more particularly to a technique to improve processing efficiency in a processor core that makes an external extended arithmetic unit execute a part of an arithmetic operation instruction by using the external extended arithmetic unit efficiently.

2. Description of the Background Art

FIG. 1 is a block diagram showing an example of a basic arrangement of a conventional processor.

The processor includes a processor core 70 and a data memory 80. The processor core 70 comprises a fetch PC (FPC) 701 for fetching an instruction, an address incrementer 702 for incrementing an address in an instruction memory, an instruction memory 703 for storing an instruction, an instruction register 704 for retaining an instruction read out from the instruction memory 703, a register file 705, a decode circuit 706 for decoding an instruction, a source (1) register 707 and a source (2) register 708, an execute stage control register 710, an arithmetic circuit 711 for executing an arithmetic operation, a pipeline control circuit 712 for controlling pipeline processing in the processor, a memory stage data register 713, a memory stage control register 715, a register write stage data register 716, a register write stage control register 717, and an instruction validating register 718.

The processor core 70 executes an instruction by, for example, a 5-stage pipeline structure. In other words, in the processor core 70, the pipeline stages include a pipeline stage 1 (instruction fetch stage), a pipeline stage 2 (register read stage), a pipeline stage 3 (execute stage), a pipeline stage 4 (memory stage), and a pipeline stage 5 (register write stage).

The instruction fetch stage is a stage where an instruction is read out from the instruction memory 703, and the register read stage is a stage where a register specified by the instruction read out in the instruction fetch stage is read out from the register file 705 while the instruction is decoded by the decode circuit 706. The execute stage is a stage where the instruction is executed by the arithmetic circuit 711 in accordance with a value in the register read out in the register read stage and the decode information of the instruction, and the memory stage is a stage where an access is made to the data memory 80 in case that the instruction is a memory load or store instruction. The register write stage is a stage where an execution result in the execute stage or load data in case of a memory load instruction is written into the register file 705.

However, the conventional processor core merely executes a pre-defined instruction, and is not provided with an extended function for connecting an arithmetic unit to its exterior. In other words, because the conventional processor is not provided with mechanism or an interface signal for connecting an arithmetic unit to its exterior efficiently, the system performance cannot be improved by connecting an arithmetic unit suitable for application systems to the processor core efficiently.

Pre-integrated an arithmetic unit suitable to application systems, for example, a production-sum arithmetic circuit, in the processor core may eliminate the above problem. However, not all the application systems use the production-sum arithmetic circuit. Hence, incorporating the production-sum arithmetic circuit in every processor core may produce useless hardware, thereby causing the cost to be increased unnecessarily.

FIG. 2 is a block diagram showing a second arrangement of the conventional processor.

The processor of the arrangement shown in FIG. 2 is connected to a coprocessor at its exterior. The coprocessor receives an instruction directed to the coprocessor from the processor core, and executes the same.

The coprocessor includes in its interior a coprocessor register file 705*b*, a coprocessor source (1) register 707*b* and a coprocessor source (2) register 708*b*, a coprocessor arithmetic circuit 711*b*, and a pipeline register 720*b*.

The coprocessor executes an arithmetic operation specified by the instruction directed to the coprocessor by reading out a value in each register in the coprocessor register file 705*b* specified by the above instruction, and using the read out values as input data to the coprocessor arithmetic circuit 711*b*.

With the processor core of the arrangement shown in FIG. 2, by connecting the coprocessor to its exterior, the function can be extended, but data used in the arithmetic operation carried out by the coprocessor arithmetic circuit 711*b* is still limited to the content of the coprocessor register file 705*b* in the coprocessor. For this reason, the coprocessor arithmetic circuit 711*b* is not allowed to execute an arithmetic operation by directly using the content of the processor register file 705 in the processor core.

As has been discussed, the conventional processor core is not provided with an interface function for connecting an arithmetic unit to its exterior efficiently, and there has been a need for an extended function for executing an arithmetic operation efficiently by using an external arithmetic unit connected to the processor core.

SUMMARY OF THE INVENTION

It is therefore an object of the present invention to provide a processor core for connecting an arithmetic unit to its external efficiently, so that the system performance can be improved drastically without increasing the size thereof by connecting the arithmetic unit to its exterior to furnish an efficient interface function therebetween.

To achieve the object, an aspect of the invention provides a processor, comprising: a processor core; a data memory accessed by the processor core; and an extended arithmetic unit, connected to an exterior of the processor core, for processing a particular instruction, the extended arithmetic unit executing an arithmetic operation by using arithmetic operation data retained in a register file in the processor core and outputting a result of an arithmetic operation directly to the processor core, the processor core saving the result of the arithmetic operation executed by the extended arithmetic unit and inputted therefrom in the register file in the processor core.

Another aspect of the invention provides a processor, comprising: a processor core; a data memory accessed by the processor core; and an extended arithmetic unit, connected to an exterior of the processor core, for processing a particular instruction, the processor core, at least including: an instruction memory for storing an instruction to be executed; an instruction decode unit for reading out an instruction from the instruction memory to decode the instruction, in case that the instruction decoded is an extended arithmetic unit control instruction that should be executed by the extended arithmetic unit connected to the exterior of the processor core, the instruction decode unit also outputting at least an instruction code of the extended arithmetic unit control instruction to the extended arithmetic unit; a register file for retaining arithmetic operation data of an arithmetic operation that should be executed by the instruction decoded, in case that the arithmetic operation data is data of the extended arithmetic unit control instruction, the register file also outputting the arithmetic operation data to the extended arithmetic unit; a first operational section for executing the instruction decoded; and an extended arithmetic unit, at least including, a second operational section for executing an arithmetic operation specified by the extended arithmetic unit control instruction by using the arithmetic operation data retained in the register, and outputting an execution result of the arithmetic operation to the processor core.

Preferably, in case that the instruction decoded is the extended arithmetic unit control instruction, the processor core outputs to the extended arithmetic unit at least an instruction code that specifies an action involved in an arithmetic operation in the extended arithmetic unit and an instruction valid signal that indicates the instruction code is valid.

Preferably, the arithmetic operation data outputted to the extended arithmetic unit is a value read out from the register file in the processor core in accordance with a register number specified by a part of the extended arithmetic unit control instruction.

Preferably, the processor core includes a pipeline control unit for controlling pipeline processing in an interior of the processor core and in the extended arithmetic unit.

Preferably, the pipeline control unit outputs to the extended arithmetic unit a first pipeline stop signal for suspending execution of an instruction therein.

Preferably, the pipeline control unit outputs to the extended arithmetic unit a pipeline flush signal for abandoning execution of an instruction outputted thereto.

Preferably, the pipeline control unit stops execution of an instruction in the processor core in accordance with a second pipeline stop signal for suspending execution of an instruction, the second pipeline stop signal being inputted from the extended arithmetic unit and executed by the processor core.

Preferably, the extended arithmetic unit outputs to the processor core an arithmetic operation result invalidating signal that invalidates an execution result of an arithmetic operation executed therein.

Preferably, the data memory receives from the extended arithmetic unit at least one of an address in memory access, data, a write control signal for controlling data writing, and a read control signal for controlling data reading; reads out the data from a region specified by the address and outputs the data to the extended arithmetic unit in case that data reading is carried out because the read control signal is asserted; and writes the data inputted from the extended arithmetic unit into a region specified by the address in case that data writing is carried out because the write control signal is asserted.

Preferably, the extended arithmetic unit includes: a plurality of arithmetic circuits; a first pipeline register for storing a processing result by an arithmetic circuit in a preceding stage at a rising of a following clock; and a second pipeline register for storing a processing result by an arithmetic circuit in a succeeding stage at the rising of the following clock.

Still another aspect of the present invention provides a processor core connected to an extended arithmetic unit for processing a particular instruction to an exterior thereof, comprising: an instruction memory for storing an instruction to be executed; an instruction decode unit for reading out an instruction from the instruction memory to decode the instruction, in case that the instruction decoded is an extended arithmetic unit control instruction that should be executed by the extended arithmetic unit connected to the exterior of the processor core, the instruction decode unit also outputting at least an instruction code of the extended arithmetic unit control instruction to the extended arithmetic unit; a register file for retaining arithmetic operation data of an arithmetic operation that should be executed by the instruction decoded, and in case that the arithmetic operation data is data for the extended arithmetic unit control instruction, the register file also outputting the arithmetic operation data to the extended arithmetic unit and storing a result of an arithmetic operation executed in the extended arithmetic unit.

Preferably, in case that the instruction decoded is the extended arithmetic unit control instruction, the instruction decode unit outputs to the extended arithmetic unit at least an instruction code that specifies an action involved in an arithmetic operation by the extended arithmetic unit and an instruction valid signal that indicates the instruction code is valid.

Other features and advantage of the present invention will become apparent from the following description taken in conjunction with the accompanying drawings.

BRIEF DESCRIPTION OF DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 2 is a block diagram showing an example of a basic arrangement of the conventional processor core to which a coprocessor is connected;

FIG. 3 is a block diagram showing a basic arrangement of a first embodiment of a processor core and a processor incorporating the same according to the present invention;

FIG. 4 is a view showing an example of bit patterns of instructions executed by the processor of the first embodiment;

FIG. 5 is a view showing an input and an output of a decode circuit 106 of FIG. 3;

FIG. 6 is a view showing an input and an output of an arithmetic circuit 111 of FIG. 3;

FIG. 7 is a block diagram showing a basic arrangement of a second embodiment of a processor core and a processor incorporating the same according to the present invention.

DETAILED DESCRIPTION OF THE PREFERRED EMBODIMENTS

Figure 1:
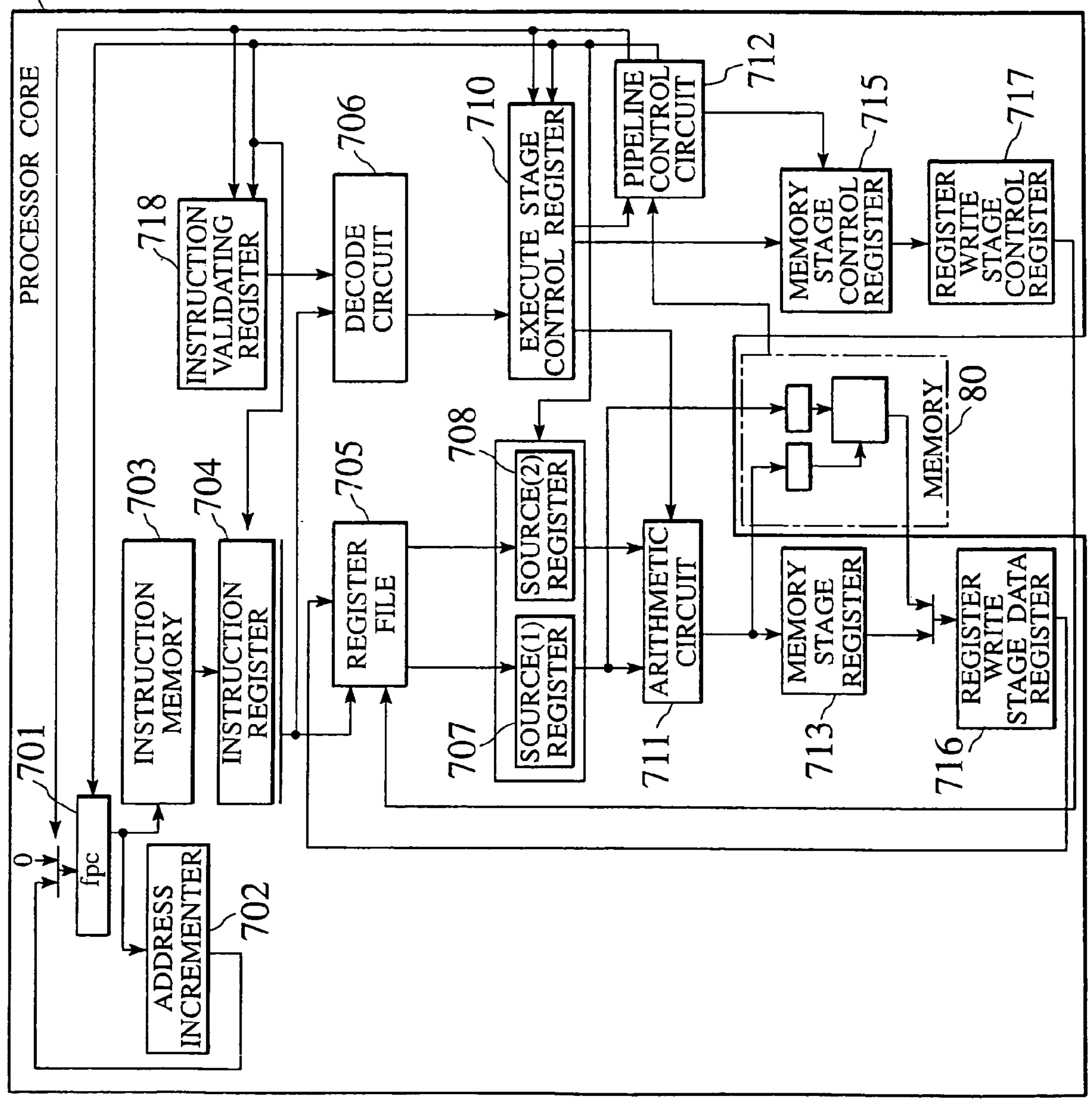
FIG. 1 is a block diagram showing an example of a basic arrangement of a conventional processor core.

The following description will describe in detail embodiments of a processor core and a processor incorporating the same in the present invention with reference to FIGS. 3 to 8.

First Embodiment

The following description will describe in detail a first embodiment of a processor core and a processor incorporating the same according to the present invention with reference to FIGS. 3 to 6.

The first embodiment provides a function for improving the system's processing efficiency by providing a processor that executes pipeline processing with an interface for connecting an arithmetic unit to the exterior of the processor core so that the arithmetic unit executes an arithmetic operation.

FIG. 3 is a block diagram showing an arrangement of a processor in accordance with the first embodiment of the present invention.

The processor of the first embodiment includes a processor core 10, an extended arithmetic unit 20 connected to the exterior of the processor core 10, and a data memory 30.

The processor core 10 comprises a fetch program counter (FPC) 101, an address incrementer 102, an instruction memory 103, an instruction register 104, a register file 105, a decode circuit 106, a source (1) register 107 and a source (2) register 108, an execute stage control register 110, an arithmetic circuit 111, a pipeline control circuit 112, a memory stage data register 113, a memory stage control register 115, a register write stage data register 116, a register write stage control register 117, and an instruction validating register 118.

The processor core 10 executes an instruction by, for example, a 5-stage pipeline structure. In other words, the processor core 10 includes the following pipeline stages: a pipeline stage 1 (instruction fetch stage) as a stage where an instruction is read out from the instruction memory 103; a pipeline stage 2 (register read stage) as a stage where a register specified by the instruction read out in the instruction fetch stage is read out from the register file 105 while the instruction is decoded by the decode circuit 106; a pipeline stage 3 (execute stage) as a stage where the instruction is executed by the arithmetic circuit 111 by using a value in the register read out in the register read stage and the decode information of the instruction; a pipeline stage 4 (memory stage) as a stage where an access is made to the data memory 30 in case that the instruction is a memory load or store instruction; and a pipeline stage 5 (register write stage) as a stage where an execution result in the execute stage or load data in case of a memory load instruction is written into the register file 105.

Typical instructions for the processor core 10 of the first embodiment include an add instruction (add), a data memory load instruction (load), a data memory store instruction (store), a jump instruction (jump), and an extended instruction (ext), and each instruction is 32-bit long, for example.

FIG. 4 is a view showing an example of a bit pattern of each instruction used in the processor core, and actions involved with each instruction will be explained with reference to FIG. 4.

The add instruction (add) is a 32-bit instruction whose 19th to 16th bits show "0000", and a value in a register specified by the src (source) 1 field is added to a value in a register specified by the src2 field, and the addition result is written into a register specified by the dst (destination) field.

The data memory load instruction (load) is an instruction whose 19th to 16th bits show "0001", and data is read out from the data memory 30 by using a value in a register specified by the src1 field as an address in the data memory 30, and the readout data is written into a register specified by the dst field.

The data memory store instruction (store) is an instruction whose 19th to 16th bits show "0010", and a value in a register specified by the src2 field is written into the data memory 30 by using a value in a register specified by the src1 field as an address in the data memory 30.

The jump instruction (jump) is an instruction whose 19th to 16th bits show "0011", and a value in a register specified by the src1 field is read out, and a jump is taken by using the readout value as a jump destination address.

The extended instruction (ext) is an instruction whose 19th to 16th bits show "0100", and values in registers respectively specified by the src1 field and scr2 field are read out to be outputted to an external extended arithmetic unit 20. The extended arithmetic unit 20 outputs an arithmetic operation result to the processor core 10, and the result is written into a register specified by the dst field.

Next, the following description will describe the basic operations of the processor core of the first embodiment in each of the foregoing pipeline stages.

(1) Operations in the Pipeline Stage 1

In the pipeline stage 1 (instruction fetch stage), the following operations are carried out repetitively. That is, an instruction specified by a value in the fetch PC 101 is read out from the instruction memory 103. The instruction read out from the instruction memory 103 is written into the instruction register 104 and a value in the instruction validating register 118 is set to 1 at the rising of the following clock. The number of bytes of an instruction word (four in case of a 4-byte instruction word) is added to the value in the fetch PC 101 in the address incrementer 102, and the result is stored in the fetch PC 101 at the rising of the following clock, after which the following instruction is read out from the instruction memory 103.

(2) Operations in the Pipeline Stage 2

In the pipeline stage 2 (register read stage), a value in a register specified by the instruction in the instruction register 104 is read out from the register file 105. In case of the instruction shown in FIG. 4, the 27th to 24th bits of the instruction are assigned as the src1 field, and the 23rd to 20th bits are assigned as the src2 field, and a value in a register specified by each set of bits is read out from the register file 105. The values in the registers read out from the register file 105 are stored respectively into the source (1) register 107 and source (2) register 108 at the rising edge of the following clock. As it will be described below, the values in the registers read out from the register file 105 are also stored in an execute stage register 201 in the extended arithmetic unit, and used as input data for an arithmetic operation executed by the extended arithmetic unit.

The decode circuit 106 decodes the instruction in the instruction register 104 when a value “1” is set in the instruction validating register 118 and the instruction stored in the instruction register 104 is valid. As a result of this decoding, the decode circuit 106 outputs control information of the arithmetic circuit 111, the number and valid information of the destination register, and pipeline flush information in case of a jump instruction to the execute stage control register 110. Each kind of the foregoing information is stored into the execute stage control register 110 at the rising of the following clock.

Further, the operation of the decode circuit 106 will be explained more in detail.

The decode circuit 106 reads out a 32-bit instruction from the instruction register 104 and outputs control information as shown in FIG. 3. The decode circuit 106 outputs the 31st to 28th bits of the instruction as the number of the destination register (dst number).

The destination valid information indicates a value “1” (valid) when the decoded instruction is an add, load, or ext instruction that involves writing into a register, and a value “0” (invalid) when the decoded instruction is any other kind of instruction.

The pipeline flush information (Flush) indicates a value “1” (valid) when the decoded instruction is a jump instruction, and a value “0” (invalid) when the decoded instruction is any other kind of instruction.

The extended instruction valid information (ext valid) indicates a value “1” (valid) when the decoded instruction is an ext instruction, and a value “0” (invalid) when the decoded instruction is any other kind of instruction.

In addition, the 15th to 0 bits of the instruction code are outputted as extended instruction information (code 16), which is outputted to the external extended arithmetic unit 20.

(3) Operations in the Pipeline Stage 3

In the pipeline stage 3 (execute stage), the arithmetic circuit 111 receives data from the source (1) register 107 and source (2) register 108, and carries out an arithmetic operation in accordance with control information of the self in the execute stage control register 110. The control information of the arithmetic circuit 111 corresponds to an output of the decode circuit 106 shown in FIG. 3, and the arithmetic circuit 111 carries out operations as shown in FIG. 4. In other words, when the control information of the arithmetic circuit 111 indicates a value “00” (nop), output data from the arithmetic circuit 111 is the content of the source (1) register 107, and when the control information of the arithmetic circuit 111 indicates a value “01” (add), output data from the arithmetic circuit 111 includes the contents of the source (1) register 107 and source (2) register 108. Also, when the control information of the arithmetic circuit 111 indicates a value “10” (ext), a selector 109 does not select an output from the arithmetic circuit 111 but an input from the extended arithmetic unit 20, which is delivered to the memory stage.

The arithmetic operation result (output data) from the arithmetic circuit 111 is stored in the memory stage data register 113, and in case that the instruction is a data load instruction or a data store instruction demanding an access to the data memory 30, an output from the arithmetic circuit 111 is outputted as an address in the data memory 30. In case of a data store instruction, a value from the selector 109 is outputted as data to be stored in the data memory 30.

The number and valid information of the destination register in the execute stage control register 110 are stored in the memory stage control register 115 at the rising of the following clock.

When the pipeline flush information is validated by a jump instruction, the pipe line control circuit 112 asserts a pipeline flush signal, and invalidates the valid information of the instruction validating register 118 and execute stage control register 110 at the rising of the following clock, so that neither the decode stage nor execute stage will be operated in the following clock.

In addition, when the pipeline flush signal is activated, the pipeline control circuit 112 effects a control in such a manner that the following value in the fetch PC 101 is the jump destination address of an output from the arithmetic circuit 111.

At the same time, the pipeline control circuit 112 outputs the pipeline flush signal to the extended arithmetic unit 20 so as to disable the execute stage register 201 in the extended arithmetic unit 20.

When a pipeline stall (stop) request is issued from the data memory 30 or a pipeline stop request is issued from the extended arithmetic unit 20, the pipeline control circuit 112 outputs a control signal to each module so that a value in each of the fetch PC 101, instruction register 104, instruction validating register 118, source (1) register 107, source (2) register 108, and execute stage control register 110 will not be updated at the rising of the following clock.

In case of a pipeline stall request from the data memory 30, the pipeline control circuit 112 outputs the control signal also to the memory stage control register 115, so that a value in the memory stage control register 115 will not be updated either.

At the same time, the pipeline control circuit 112 outputs a pipeline stop signal to the extended arithmetic unit 20 to effect a control in such a manner that a value in the execute stage register 201 in the extended arithmetic unit 20 will not be updated.

(4) Operations in the Pipeline Stage 4

In the pipeline stage 4 (memory stage), in case that the instruction is a data load instruction, data is read out from the data memory 30 and stored in the register write stage data register 116 in the following clock. In case that the instruction is any other kind of instruction, a value in the memory stage data register 113 is stored in the register write stage data register 116 in the following clock. In addition, information of the memory stage control register 115 is stored in the register write stage control register 117 in the following clock.

(5) Operations in the Pipeline Stage 5

In the pipeline stage 5 (register write stage), when the valid information in the register write stage control register 117 shows valid, a control is effected in such a manner that a value in the register write stage data register 116 is written into a register in the register file 105 specified by the destination register number in the register write stage control register 117.

Next, the following description will describe an arrangement and operations of the extended arithmetic unit 20 of the first embodiment.

The extended arithmetic unit 20 is connected to the processor core 10, and receives from the processor core 10 a value in a register corresponding to each of the src1 and src2 fields in the instruction read out from the register file 105 in the decode stage thereof.

Also, the extended arithmetic unit 20 receives extended instruction information (code 16) corresponding to the lower 16 bits in the instruction from the decode circuit 106, and extend instruction valid information that indicates a value "1" when the instruction in the decode stage is an extended instruction ext. Each kind of the foregoing information is stored in the execute stage register 201 at the rising of the following clock unless the pipeline flush signal or the pipeline stall signal from the processor core 10 is asserted. On the other hand, when the pipeline stall signal from the processor core 10 is asserted, a value in the execute stage register 201 is not updated.

When the pipeline flush signal from the processor core 10 is asserted, the extended instruction valid information is forcibly invalidated (0) at the rising of the following clock, so that the extended arithmetic unit 20 will not carry out an arithmetic operation.

A stage (1) arithmetic circuit 202 is a unit that carries out an arithmetic operation in a stage corresponding to the memory stage in the processor core 10. The stage (1) arithmetic circuit 202 is operated by decoding the extended instruction information code 16 inputted from the processor core 10 by means of a control circuit 204. The stage (1) arithmetic circuit 202 can use a part of the extended instruction information as input data of an arithmetic operation.

An arithmetic operation result by the stage (1) arithmetic circuit 202 is stored in the pipeline (1) register 205 at the rising of the following clock. A result in a pipeline (1) register 205 can be used as input data to a following stage (2) arithmetic circuit 203. A result in the stage (2) arithmetic circuit 203 is stored in a pipeline (2) register 206 at the rising of the following clock.

The following is an example of an extended instruction sequence in the first embodiment:

1. ext dst,src1,src2,0×0001 acc←src1*src2;dst←src1
2. ext dst,src1,src2,0×0002 acc←acc+src1*src2;dst←src1
3. ext dst,src1,src2,0×0003 dst←acc In order to execute these instructions 1 to 3, the stage (1) arithmetic circuit 202 in the extended arithmetic unit 20 carries out a multiplication (instruction 1), and the stage (2) arithmetic circuit 203 adds the multiplication result of the stage (1) arithmetic circuit 202 inputted from the pipeline (1) register 205 to a value in the pipeline (2) register 206 (instruction 2). A result in the stage (2) arithmetic circuit 203 is stored again in the pipeline (2) register 206 (in this case, acc register).

With the instruction 1, the stage (1) arithmetic circuit 202 carries out a multiplication of the inputs from the processor core 10: source (1) data (src1) and source (2) data (src2), and a result is stored in the pipeline (1) register 205 at the rising of the following clock. The stage (2) arithmetic circuit 203 remains inactive, and the multiplication result stored in the pipeline (1) register 205 is stored in the pipeline (2) register 206 at the rising of the following clock. In addition, the stage (1) arithmetic circuit 202 outputs the source (1) data to the processor core 10 as a result of the instruction execution. This corresponds to the execute stage in the processor core 10, and the processor core 10 writes the result of the instruction 1 in the register file 105 at the processor core 10 side in the register write stage.

With the instruction 2, the operations up to the stage 1 are the same as those with the instruction 1. The stage (2) arithmetic circuit 203 adds a result in the pipeline (1) register 205 to a result in the pipeline (2) register 206, and stores the addition result in the pipeline (2) register 206. The stage (1) arithmetic circuit 202 outputs the source (1) data to the processor core 10 as a result of the instruction execution. This corresponds to the execute stage in the processor core 10, and the processor core 10 writes the result of the instruction 2 in the register file 105 at the processor core 10 side in the register write stage.

With the instruction 3, the pipeline (2) register 206 is read out, and the stage (1) arithmetic circuit 202 outputs the source (1) data to the processor core 10 as a result of the instruction. This corresponds to the execute stage in the processor core 10, and the processor core 10 writes the result of the instruction 3 in the register file 105 in the register write stage.

The result of either of the instructions 1 or 2 is stored in the pipeline (2) register 206. Thus, when the instruction 3 is stored in the execute stage register 201, the control circuit 204 checks whether the instruction 1 or 2 is stored in the pipeline (1) register 205. In this case, the pipeline stop signal (pipeline stall signal) to the processor core 10 is asserted for one cycle to stop the pipeline processing at the processor core 10 side and read out the result of the instruction 1 or 2 in the following clock cycle, thereby outputting the result to the processor core 10 through the stage (1) arithmetic circuit 202.

In other words, the control circuit 204 checks an instruction that demands more than one cycle when executed at the extended arithmetic unit 20 side, and asserts the pipeline stop signal to the processor core 10 side, so that the pipeline processing at the processor core 10 side is suspended until the timing at which the arithmetic operation result can be outputted to the processor core 10 side.

As has been discussed, according to the first embodiment, the processor core 10 is provided with an extended instruction for controlling the extended arithmetic unit 20, and the control circuit for executing the extended instruction and the interface circuit for controlling the extended arithmetic unit 20 and transferring data are incorporated therein. Consequently, the extended arithmetic unit 20 can be connected to the exterior of the processor core 10 efficiently, and the extended arithmetic unit 20 can execute an arithmetic operation by using the content of the register file 105 at the processor core 10 side as an input data, and output an arithmetic operation result directly to the processor core 10.

For example, assume that a product-sum operational circuit having a latency of two cycles and a throughput of one cycle is provided as the extended arithmetic unit 20, and it takes for the processor 10 five cycles and one cycle to execute a multiplication instruction and an add instruction, respectively. Then, ten times of product-sum operations can be executed in 11 cycles by using the product-sum operational circuit serving as the extended arithmetic unit 20. In contrast, in case of a combination of the multiplication instruction and add instruction by the processor core 10, (5+1)×10=60 cycles are necessary.

The product-sum operational circuit may be pre-incorporated in the processor core 10, but a product-sum operation is not used at all in many application systems, and the product-sum arithmetic unit is useless hardware for these application systems, thereby causing the cost to be increased unnecessarily.

On the other hand, according to the first embodiment, besides the above product-sum operation example case, by connecting various kinds of arithmetic units suitable for application systems to the exterior of the processor core 10 and downsizing the arrangement of the processor core 10 to the minimum, the system performance can be improved by executing processing efficiently between the processor core 10 and extended arithmetic unit 20 while saving the manufacturing costs of the processor core 10.

In the above explanation, the extended arithmetic unit 20 is of a 2-stage pipeline structure composed of the stage (1) arithmetic circuit 202 and stage (2) arithmetic circuit 203. However, the arrangement of the extended arithmetic unit 20 is not limited to the foregoing, and the extended arithmetic unit 20 can have three or more stages as the pipeline stages.

In addition, the case of reading out the result of an instruction that demands more than one stage when executed was explained as an example of a pipeline stall request (asserting a pipeline stop signal) to the processor core 10. However, the example is not limited to the foregoing. For example, when pipeline processing is not carried out in the interior and an instruction demands more than one cycle when executed, the execution of the following instruction may be suspended until the currently executed instruction is completed. This can be realized by managing the state of instruction execution by the control circuit 204.

Unlike the coprocessor connected to the conventional processor shown in FIG. 2, the extended arithmetic unit 20 of the first embodiment carries out an arithmetic operation by using data in the register file 105 in the processor core 10, and the processor core 10 receives an arithmetic operation result outputted from the extended arithmetic unit 20 and saves the same in the register file 105 therein. Consequently, the system's processing efficiency can be improved more readily.

Second Embodiment

Next, with reference to FIG. 7, the following description will describe in detail a second embodiment of a processor core and a processor incorporating the same according to the present invention as to differences from the first embodiment alone.

Compared with the first embodiment shown in FIG. 3, the second embodiment is an embodiment additionally provided with a function of directly accessing the data memory.

FIG. 7 is a block diagram showing an example of an arrangement of a processor in accordance with the second embodiment of the present invention. Like members with respect to FIG. 3 are designated by like reference characters and the explanation of these members is not repeated for ease of explanation.

In the processor of the second embodiment, the processor core 10 is of the same arrangement as that shown in FIG. 3, but different in that a stage (1) arithmetic circuit 402 in an extended arithmetic unit 40 can directly access a data memory 31 by outputting an address signal, a read/write control signal, and a write data signal to the data memory 31.

The data memory 31 selects the address signal, read/write control signal, write data signal from the processor core 10 by means of selectors 31*a* and 31*b* , and outputs the selected signal to a RAM module, whereby access requests from the processor core 10 and extended arithmetic unit 40 are arbitrated.

Data read out from the data memory 31 is outputted to the extended arithmetic unit 40, and either this data or an output of a stage (2) arithmetic circuit 403 is selected and stored in a pipeline (2) register 406 at the rising of the following clock.

In the extended arithmetic unit 40 of the second embodiment, a stage (3) arithmetic circuit 407 uses an output from the pipeline (2) register 406 as input data of an arithmetic operation. In this manner, a result read out from the data memory 31 can be used as arithmetic operation input data in the extended arithmetic unit 40.

According to the second embodiment, because data directly read out from the data memory 31 can be used as arithmetic operation input data in the extended arithmetic unit 40, an instruction demanding memory access can be executed by the extended arithmetic unit 40.

Third Embodiment

Figure 8:
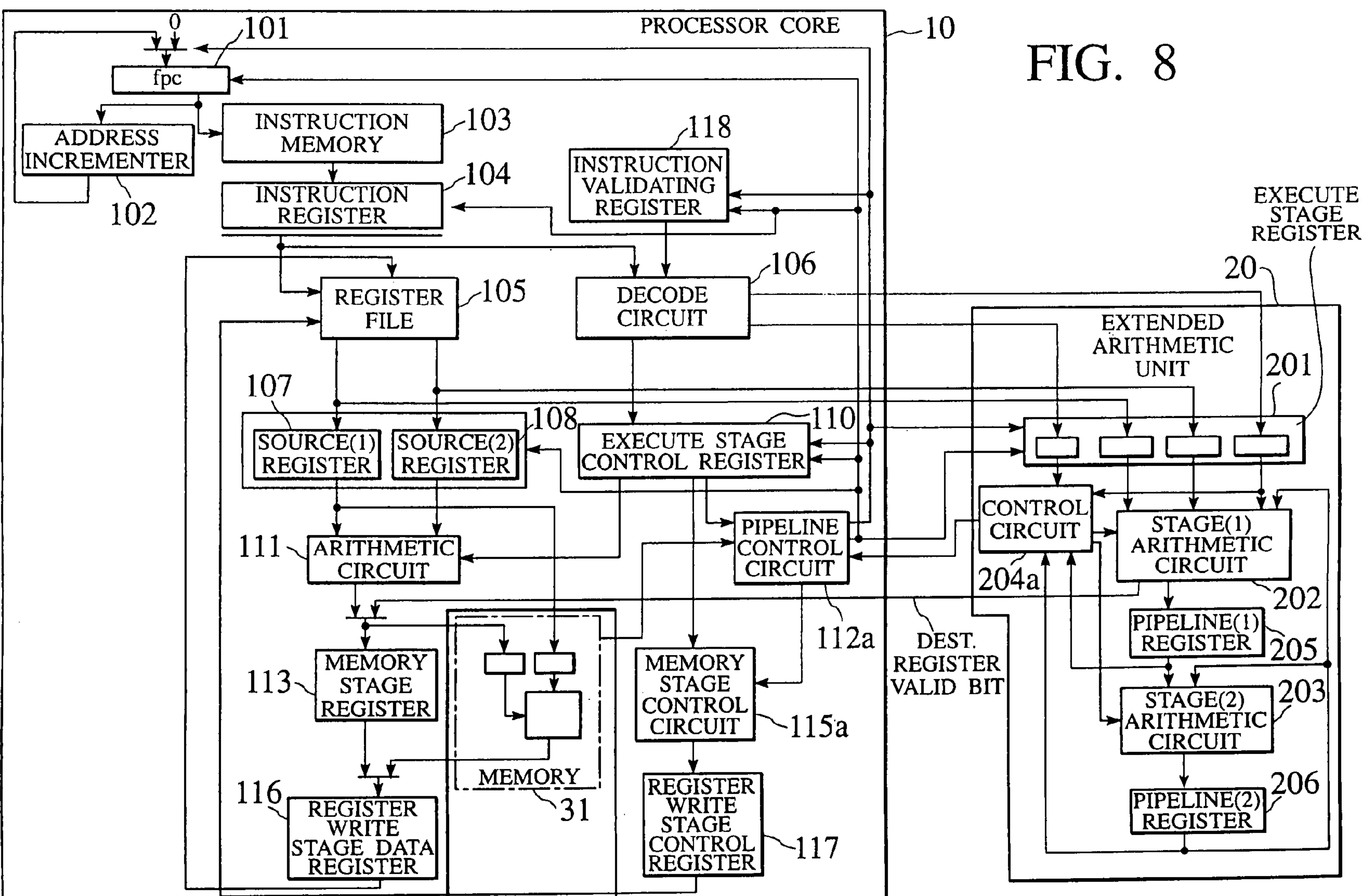
FIG. 8 is a block diagram showing a basic arrangement of a third embodiment of a processor core and a processor incorporating the same according to the present invention.

Next, with reference to FIG. 8, the following description will describe in detail a third embodiment of a processor core and a processor incorporating the same according to the present invention as to differences from the foregoing embodiments alone.

FIG. 8 is a block diagram showing an example of an arrangement of a processor in accordance with the third embodiment of the present invention. Like members with respect to FIG. 3 are designated by like reference characters and the explanation of these members is not repeated for ease of explanation.

Compared with the first embodiment shown in FIG. 3, the processor of the third embodiment is an embodiment such that, by outputting destination valid information from the extended arithmetic unit 20 to the processor core 10, an arithmetic operation result in the execute stage in the processor core 10 is invalidated by the processor core 10 so as not to be written into a register in the register write stage. The destination valid information is the information that shows whether an arithmetic operation result should be written into the destination register in the processor core 10, and for example, can be realized by a bit that enables/disables the destination register in the processor core 10.

In the third embodiment, the extend instruction shown in the first embodiment is changed as follows:

| Instruction | Operation |
|---|---|
| 1. ext src1, src2, 0x0001 | acc <- src1*src2; |
| 2. ext src1, src2, 0x0002 | acc <- acc+src1*src2; |
| 3. ext dst, src1, src2, 0x0003 | dst <- acc |

The register acc is a register in the extended arithmetic unit 20, and results of the instruction 1 and 2 are not written back into the register file 105 in the processor core 10.

For this reason, a control circuit 204*a* in the extended arithmetic unit 20 invalidates the destination valid information and outputs the same to the processor core 10. The destination register valid information of the execute stage control register 110 in the processor core 10 indicates a value of invalid (0) in this case, which is stored in a memory stage control register 115*a* at the rising of the following clock.

With the instruction 3, the result of an arithmetic operation executed by the extended arithmetic unit 20 is written back into the register file 105 in the processor core 10. For this reason, the control circuit 204*a* in the extended arithmetic unit 20 validates the destination valid information and outputs the same to the processor core 10.

On the other hand, while the extend instruction is executed, the processor core 10 effects a control in such a manner that the destination valid information outputted from the control circuit 204*a* in the extended arithmetic unit 20 is stored in the memory stage control register 115*a* at the rising of the following clock.

In some cases of the pipeline control in the processor core 10, when the destination registers in both the execute stage and memory stage are enabled, and the register number coincides with the register number to be read out in the register read stage, the pipeline may be stalled. When an extended instruction is an instruction that prohibits writing into the register file 105 in the processor core 10, the stall of the pipeline, which is unnecessary at all, can be avoided by providing a function for making the extended arithmetic unit 20 output information indicating prohibition of writing back into the destination register to the processor core 10. In addition, because data is not sent uselessly from the extended arithmetic unit 20 to the processor core 10, power consumption or the like can be saved as well.

In summary, according to the present invention, by providing an extended arithmetic unit instruction as an instruction for controlling the extended arithmetic unit, and a function of controlling execution of the extended arithmetic unit instruction as well as an interface function for connecting the extended arithmetic unit, the extended arithmetic unit can be connected efficiently to the exterior of the processor core. Consequently, by connecting various kinds of extended arithmetic units suitable for application systems to the exterior of the processor core and downsizing the arrangement of the processor core to the minimum, the system performance can be improved by executing efficient processing between the processor core and extended arithmetic unit while saving the manufacturing costs of the processor core.

It is to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. A processor, comprising a processor core for executing an instruction in a pipeline processing;

a data memory accessed by said processor core; and an extended arithmetic unit, connected to an exterior of said processor core, for processing an extended instruction decoded in said processor core in the pipeline processing, said extended arithmetic unit executing an arithmetic operation by using arithmetic operation data retained in a register file in said processor core, and outputting a result of an arithmetic operation directly to a pipeline stage processing after an executing stage processing in said processor core, said processor core receiving the result of the arithmetic operation executed by said extended arithmetic unit and inputted therefrom into said register file in said processor core, wherein said extended arithmetic unit outputs to said processor core an arithmetic operation result invalidating signal that invalidates an execution result of an arithmetic operation executed in said processor core, and said processor core, if the invalidating signal is asserted, controls the pipeline not to stall, in case that a value of a destination register number in an extended instruction code and a value of a register number read out by a succeeding instruction coincide with each other.

2. The processor according to claim 1, wherein, in case that the instruction decoded is said extended instruction, said processor core outputs to said extended arithmetic unit at least an instruction code that specifies an action involved in an arithmetic operation in said extended arithmetic unit and an instruction valid signal that indicates said instruction code is valid.

3. The processor according to claim 1, wherein said arithmetic operation data outputted to said extended arithmetic unit is a value read out from said register file in said processor core in accordance with a register number specified by a part of said extended instruction.

4. The processor according to claim 1, wherein said processor core includes a pipeline controller for flushing or stopping the pipeline processing in said extended arithmetic unit, said pipeline controller controlling pipeline processing in an interior of said processor core and in said extended arithmetic unit.

5. The processor according to claim 1, wherein said processor core includes a pipeline controller for flushing or stopping the pipeline processing in said extended arithmetic unit, said pipeline controller outputting to said extended arithmetic unit a first pipeline stop signal for stopping the pipeline processing in said extended arithmetic unit.

6. The processor according to claim 1, wherein said processor core includes a pipeline controller for flushing or stopping the pipeline processing in said extended arithmetic unit, said pipeline controller, in case that the instruction decoded is a jump instruction, outputting to said extended arithmetic unit a pipeline flush signal for flushing a register in said extended arithmetic unit.

7. The processor according to claim 1, wherein said processor core includes a pipeline controller for flushing or stopping the pipeline processing in said extended arithmetic unit, and said extended arithmetic unit further comprising a second pipeline controller for, in case that the extended instruction requires more than one cycle, asserting a second pipeline stop signal for stopping the pipeline processing in said processor core.

8. The processor according to claim 1, wherein said extended arithmetic unit includes:

a plurality of pipeline-structured arithmetic circuits;

a first pipeline register for storing a processing result by an arithmetic circuit in a preceding stage at a rising of a following clock; and a second pipeline register for storing a processing result by an arithmetic circuit in a succeeding stage at the rising of the following clock.

* * * * *